United States Patent [19]

Sankey

[11] Patent Number: 4,743,814
[45] Date of Patent: May 10, 1988

[54] STATIC POWER CONVERSION FOR ADDING DC MOTORS

[76] Inventor: Edwin W. Sankey, 645 Leetonia Rd., Marion, Ohio 43302

[21] Appl. No.: 11,535

[22] Filed: Feb. 6, 1987

[51] Int. Cl.⁴ .......................... H02P 7/34; H02K 7/20
[52] U.S. Cl. .................................... 318/140; 318/137; 318/433
[58] Field of Search ........................ 318/45, 46, 47, 51, 318/60, 81, 97, 136, 137, 140, 432, 433; 37/244, 246; 254/339, 340, 362

[56] References Cited

U.S. PATENT DOCUMENTS

| | | | |
|---|---|---|---|
| 2,567,427 | 9/1951 | Fox | 318/140 X |
| 2,996,876 | 8/1961 | Beneditz | 318/432 X |
| 3,460,278 | 8/1969 | Pesavento et al. | 36/116 |
| 4,292,572 | 9/1981 | Ivy | 318/81 X |
| 4,489,243 | 12/1984 | Nola | 318/46 X |

FOREIGN PATENT DOCUMENTS

| | | | |
|---|---|---|---|
| 2308241 | 11/1976 | France | 318/432 |
| 54-140123 | 10/1979 | Japan | 318/140 |
| 1469213 | 4/1977 | United Kingdom | 318/60 |

Primary Examiner—Bentsu Ro

[57] ABSTRACT

A method and apparatus of adding a DC drive motor to an existing Ward-Leonard motor-generator motion drive for a material handling device which utilizes static power conversion to supply the armature current of the added DC drive motor. Existing drive motors receive their power from corresponding generators which are shaft driven by an AC motor. The added DC motor obtains its power through a transformer which reduces AC line voltage down to the proper level and which is then converted to a variable voltage reversible DC armature supply by a power conversion module. The speed of the existing motors and the added motor is synchronously controlled from an operator's master switch.

8 Claims, 2 Drawing Sheets

STATIC POWER CONVERSION FOR ADDING DC MOTORS

BACKGROUND OF THE INVENTION

The present invention relates to a method and apparatus for adding a DC drive motor to a motor-generator set for driving a motion of a material handling device. In particular, this invention relates to the use of static power conversion to supply the armature current of the added DC drive motor thus eliminating the need for an extra generator to provide power to the added DC motor with the attendant problems of attempting to synchronize an added motor-generator set with the existing motor-generator set.

Material handling apparatus, for example, a dragline, have a material handling device such as a bucket or scoop suspended from an inclined boom by means of a first cable. In such case, the bucket is designed so that when it is pulled toward the base of the boom by a second cable, it will scrape soil or other material from the surface being excavated. The first and second cables are normally wound up on motor driven reels such that rotation of the respective reels in one direction or the other will determine the position of the bucket and its direction of movement. Completely independent hoist and drag machinery is used for these operations including the electrical system. In addition, a third motion, such as swing, may be used to rotate the upper portion of the apparatus with respect to its base. This motion also requires separate driving machinery. Thus, at least one driving motor is used for each motion of the material handling device such as the bucket of a dragline excavator. For instance, one or more electric motors are used to hoist the bucket and one or more separate electric motors are used to drag the bucket in a horizontal plane and one or more separate electric motors are used to rotate the upper portion of the apparatus. In other material handling devices, such as a power shovel, one or more electric motors are used to provide a crowd force for the shovel. In each of these cases, for each driving motor a separate generator is used and the generators are driven by one or more AC motors. No attempt is normally made to switch the generators from one motion motor to another motion motor. This is done because the current flow interruptions through existing electrical knife blades, contactors and so forth would cause tremendous arcing problems.

However, once the material handling apparatus or device is constructed, it is almost impossible to add an additional motor to add greater power in one or more of the motions because there must also be added to the system an additional generator and an AC motor to drive the generator. Even if space were available to add the extra DC motor, the extra DC generator and the extra AC motor to drive the generator, the approach would be very expensive.

The present invention relates to a static power conversion device which may be coupled between an additional motor and a power line source for converting the power line voltage to a variable DC armature supply voltage for the additional drive motor. Static power conversion devices are old and well-known in the art and utilize solid-state devices such as silicon controlled rectifiers, thyristors, and the like in a three-phase bridge rectifier circuit to convert the AC voltage to a DC voltage which can be used to drive an additional motor in synchronism with the existing motor-generator set to increase the power to the motion being driven by the existing motor-generator set.

Thus it is an object of the present invention to provide additional power to a motion of a material handling device by using static power conversion to obtain the necessary voltage to drive the added motor.

It is also an object of the present invention to utilize a static power conversion device for converting three-phase AC line voltage to a variable selectively reversible DC voltage and coupling the DC voltage to the armature and shunt field of an additional motor to drive the motor to assist an existing motor-generator set to drive a motion of the material handling device.

SUMMARY OF THE INVENTION

Thus the present invention relates to an improved handling device movable in at least first and second motions and having a power line and at least one motor-generator set coupled to said power line for providing power to drive at least said first motion, said motor-generator set having field exitation windings provided with electrical current and at least a first motion control means for producing an output signal coupled to said generator field exitation windings for varying said current therethrough to control the power to said at least first motion, the improvement comprising an additional electrical motor mounted on said apparatus and mechanically coupled to said at least first motion for providing additional power to drive said at least first motion, and static power conversion means coupled between said additional motor and said power line for converting said power line voltage to a variable DC armature supply voltage for said additional drive motor.

The invention also relates to an improved method of controlling a material handling device movable in at least first and second motions, coupling at least one motor-generator set to a power line for providing power to drive at least said first motion, providing field exitation windings on said motor-generator set with electrical current and coupling at least a first motion control means output signal to said generator field exitation windings for varying said current therethrough to control the power to said at least first motion, the improvement comprising the steps of mechanically coupling an additional electrical motor on said apparatus to said at least first motion for providing additional power to drive said at least first motion, and coupling a static power conversion means between said additional motor and said power line for converting said power line voltage to a variable DC armature supply voltage for said additional drive motor.

BRIEF DESCRIPTION OF THE DRAWINGS

These and other objects of the present invention will be disclosed in conjunction with a accompanying drawings in which like numerals represent like components and in which.

DETAILED DESCRIPTION OF THE DRAWINGS

Figure 1:
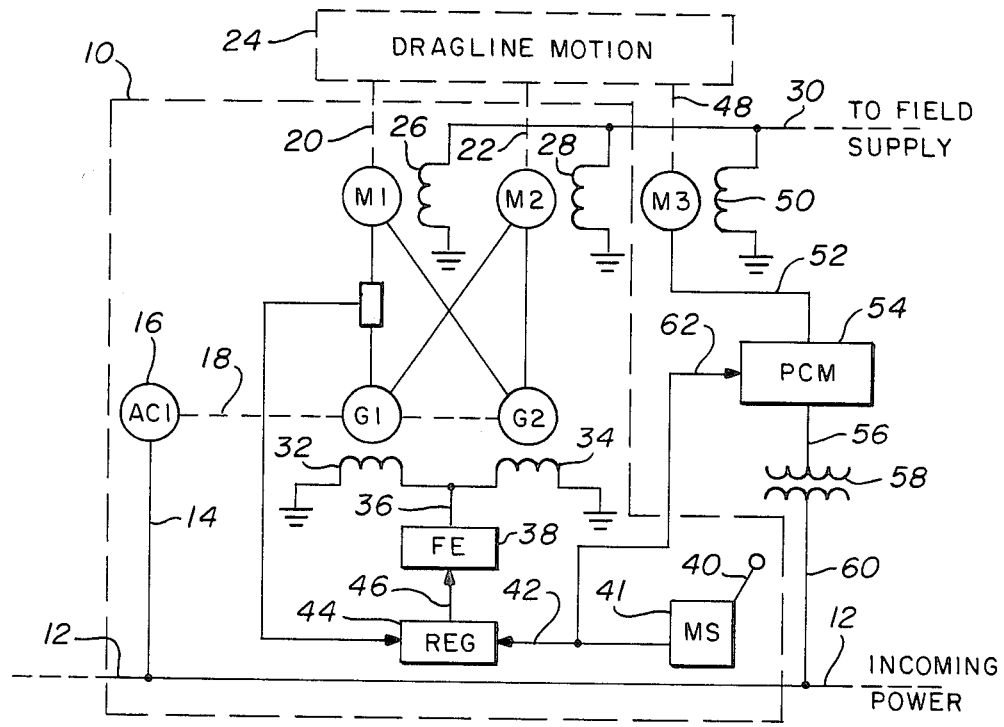
FIG. 1 is a schematic diagram representing a material handling device in which two motor-generator sets are used to drive a particular motion and in which an additional motor is added to give additional power to the motion with the additional motor being supplied power through a static power conversion module.

In FIG. 1, the equipment within the dashed area indicated by the numeral 10 represents the existing apparatus in the prior art for controlling the motion of a material handling device such as a dragline. In FIG. 1, the incoming power on line 12 is three-phase AC voltage of several hundred volts. It is coupled through conductor 14 to AC motor 16 which, through a mechanical drive means 18, drives generators G1 and G2; this comprises a motor-generator set; generators G1 and G2, and motors M1 and M2 are connected in a motor-generator loop. This is a typical Ward-Leonard system, well-known in the art, with the output of the motors M1 and M2, through mechanical couplings 20 and 22, providing the power to the motion 24 which may be any of the motions on the dragline, power shovel or the like. Field exitation coils 26 and 28 for motors M1 and M2 receive power from a field current supply on line 30 in a manner well-known in the art. Field exitation winding 32 for generator G1 and exitation winding 34 for generator G2 are both coupled through line 36 to a generator field exitation unit 38 which may be any well-known type of device for varying the current through the field exitation coils or windings 32 and 34 thereby controlling the current output of DC generators G1 and G2. The operator has a control device such as a lever 40 which causes a master switch 41 to produce an output on line 42 to a regulator unit 44 which produces an output on line 46 to control the field exitation unit 38 as is well-known in the art.

Thus the operator by controlling lever 40 varies the current through the field exitation coils 32 and 34 of DC generators G1 and G2 thereby varying the output current to DC drive motors M1 and M2 which are coupled, usually to a common gear train, to provide power to operate a first motion of the equipment such as hoist, drag, swing, crowd or the like. Control lever 40, of course, controls only one motion and other controls would control other motions with similar circuits.

Once the material handling apparatus has been built, it has been, in the past, possible to add power to one motion or the other only by adding one or more additional motor-generator pairs such as M1-G1 or M2-G2 as shown in FIG. 1. However, such additional motor-generator pair would have to include an additional AC motor driving the added DC generator which would produce the output to drive the additional DC drive motor. The disadvantages of adding an additional motor as described are obvious. In the first place it is extremely difficult to find space on the apparatus for the added motor-generator set. It would also be very expensive to add even one additional motor-generator set for any motion. Further, even when these difficulties are overcome, the inability to make the added motor to perform in electrical harmony with the existing motors is still prevalent.

FIG. 1 includes a diagram of a system for adding an additional motor to assist in driving a particular motion in a manner that is relatively economical, provides good electrical harmony, is easy to install, which utilizes a minimum of space and which utilizes well-known apparatus. In FIG. 1, the additional motor M3 is coupled to motion 24 by mechanical means 48. Again, it has a field exitation winding 50 which is coupled to field supply 30. The armature voltage is received on line 52 from a static power converter module 54. The output of the conversion module 54 on line 52 is the proper DC voltage for the armature of motor M3. The input to control module 54 on line 56 is an AC voltage coupled through a transformer 58 from line 60 which is coupled to the incoming power line 12. Power conversion module 54 consists of a three-phase bridge rectifier circuit formed of rectifiers such as thyristors, silicon controlled rectifiers or the like. Such power conversion module 54 is well-known in the art and the amount of voltage on line 52 is determined by the firing angle of the rectifiers. The firing angle is controlled by a signal on line 62 from master switch 41 and determined by movement of the control lever 40. Thus the control lever 40 not only controls the power to the field exitation windings 32 and 34 of the generators G1 and G2 respectively but also controls the armature voltage from the power conversion module 54 on line 52 to motor M3 thus synchronizing the operation of the motors M1, M2 and M3.

Figure 2:
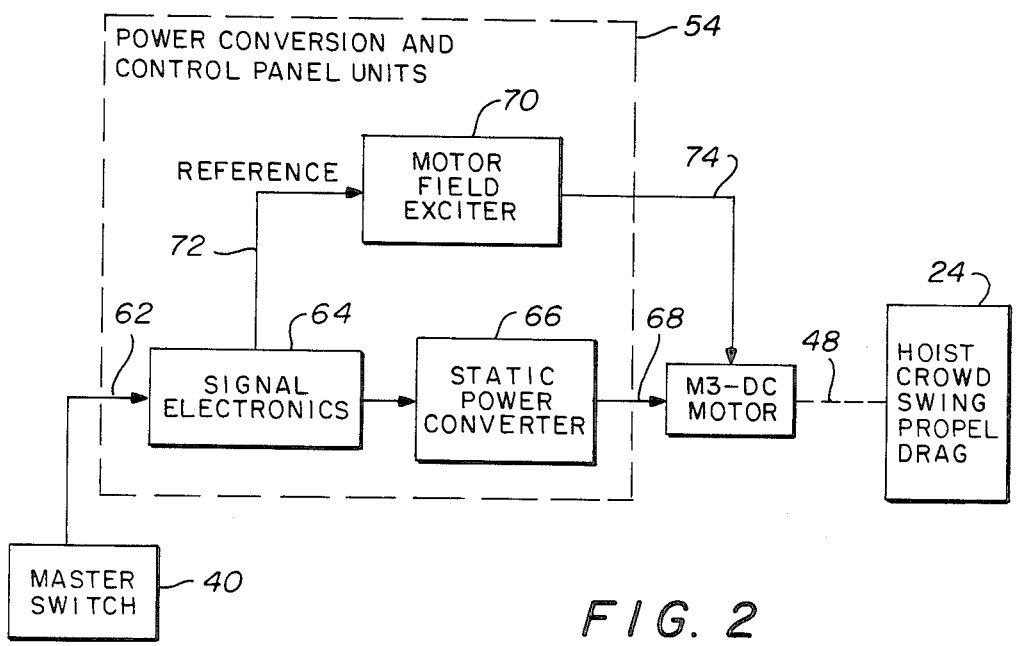
FIG. 2 is a diagrammatic representation of the static power conversion module for driving the additional DC motor.

FIG. 2 is a block diagram of the static power conversion system. As pointed out earlier, the system itself, as shown in FIG. 2, is old and well-known but has not been used, to applicant's knowledge, in conjunction with a motor-generator set to add power to a particular motion of a material handling device. The signal from the operator control lever 40 on line 62 translates the operator's commands to an electrical signal which drives the control electronics of the system. The signal electronics module 64 controls the operation of the static power converter 66. The motor field exciter 70 receives a signal on line 72 from the signal electronics module 64 and supplies regulated DC current on line 74 to the field exitation winding of the DC motor M3. The motor shaft 48 is mechanically coupled to and drives the material handling device motion load 24 which can be hoist, crowd, swing, propel, or drag or the like. As stated earlier, the signal electronics 64, static power converter 66 and motor field exciter 70, all located within the static power conversion module 54, are all old and well-known in the art and will not be described in detail.

Figure 3:
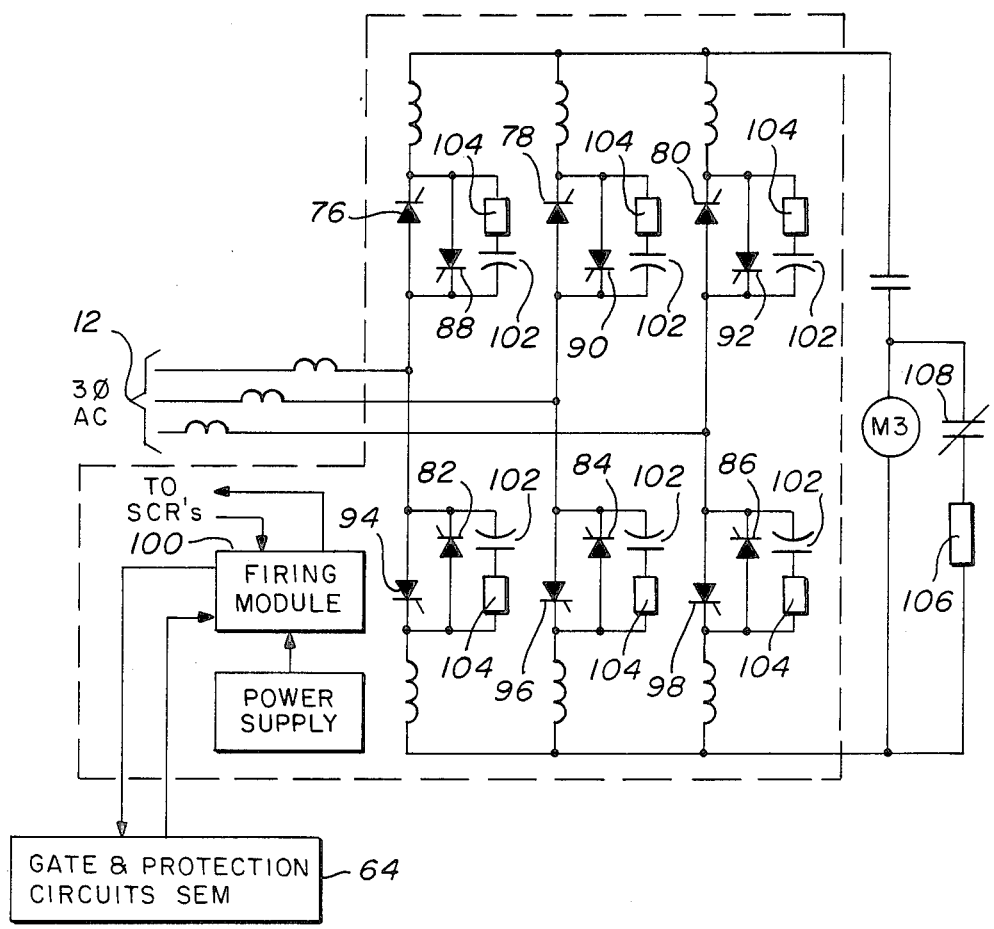
FIG. 3 is a schematic arrangement of an existing prior art static power conversion unit illustrating the silicon control rectifiers coupled in a three-phase bridge rectifier circuit.

The general configuration of the static power converter 66 is disclosed in FIG. 3 as prior art. It should be understood that the converter can take various forms as is well-known in the prior art and FIG. 3 is simply illustrative of one of the prior art forms. As can be seen in FIG. 3, the motor M3 is connected to a three-phase bridge rectifier circuit which is reversible and can supply reverse polarity voltage to motor M3. The three-phase AC voltage on line 12 is coupled to a series of thyristors or silicon controlled rectifiers in the three-phase bridge configuration to supply the necessary DC current to motor M3. For instance, thyristors 76, 78, 80, 82, 84 and 86 supply DC current through motor M3 in one direction while thyristors 88, 90, 92, 94, 96 and 98 supply current to motor in the reverse direction. The selection of those thyristors which are to be fired is controlled by a firing module 100 which is directed by and receives its signals from the signal electronics module 64. Each of the thyristor pairs (e.g. 76 and 88) are paralleled with a snubber circuit comprised of a series capacitor 102 and resistor 104 to prevent the voltage across the thyristors from changing too rapidly. In addition, the aramature circuit of motor M3 is equipped with an energy absorbing resistor 106 normally shunted by a DC contactor or circuit breaker 108. Resistor 106 is automatically inserted to limit fault current or provide dynamic breaking as required.

Thus while the use of static power conversion is old and while the use of motor-generator sets is old in driving one or more motions of a material handling device, it is a new and novel concept to combine static power conversion with motor-generator sets because a large support space need not be available to add the DC motor power source as would be required in the conventional method of adding a two unit motor-generator set. The components which need to be added are smaller and more economical. Thus there has been disclosed a novel method and apparatus for adding a DC drive motor to an existing Ward-Leonard motor-generator set to drive a motion of a material handling device.

While the invention has been described in connection with a preferred embodiment, it is not intended to limit the scope of the invention to the particular form set forth, but, on the contrary, it is intended to cover such alternatives, modifications and equivalents as may be included within the spirit and scope of the inventions as defined by the appended claims.

I claim:

1. In apparatus having a material handling device movable in at least first and second motions and having a power line and at least one motor-generator set coupled to said power line for providing power to drive at least said first motion, said motor-generator set having field exitation windings provided with electrical current and at least a first motion control means for producing an output signal coupled to said generator field exitation windings for varying said current therethrough to control the power to said at least first motion, the improvement comprising:
   a. an additional D.C. electrical motor mounted on said apparatus and mechanically coupled to said at least first motion for providing additional power concurrently with said at least one motor-generator set to drive said at least first motion, and
   b. static power conversion means coupled between said additional motor and said power line for converting said power line voltage to a variable DC armature supply voltage for said additional motor.

2. The improvement as in claim 1 wherein said power line provides three-phase AC voltage.

3. The improvement as in claim 2 further comprising;
   a. means in said static power conversion means for converting said three-phase A.C. voltage to a variable selectively reversible, DC voltage, and
   b. means for coupling said DC voltage to the armature of said additional motor to drive said motor.

4. The improvement as in claim 3 wherein said means for converting said AC voltage to said DC voltage comprises;
   a. a plurality of silicon controlled rectifiers coupled in a three-phase bridge rectifier circuit, and
   b. means coupling said output signal from said first motion control means to said converting means for controlling the firing of said silicon control rectifiers so as to control the output power of said static power conversion means and drive said additional motor in synchronism with said motor-generator set to increase the power to said at least first motion.

5. In a method of controlling a material handling device movable in at least first and second motions, coupling at least one motor-generator set to a power line for providing power to drive said at least first motion, providing field exitation windings on said motor-generator set with electrical current and coupling at least a first motion control means output signal to said generator field exitation windings for varying said current therethrough to control the power to said at least first motion, the improvement comprising the steps of:
   a. mechanically coupling an additional D.C. electrical motor on said apparatus to said at least first motion for providing additional power concurrently with said at least one motor-generator set to drive said at least first motion, and
   b. coupling a static power conversion means between said additional motor and said power line for converting said power line voltage to a variable DC armature supply voltage for the armature of said additional D.C. drive motor.

6. The improved method as in claim 5 further comprising the step of providing three-phase AC voltage with said power line.

7. The improved method as in claim 6 further comprising the steps of:
   a. converting said three-phase AC line voltage to a variable, selectively reversible, DC voltage with said static power conversion means,
   b. coupling said DC voltage to said armature of said additional motor to drive said motor.

8. The improved method as in claim 7 wherein the step of converting said AC voltage to said DC voltage further comprises the steps of:
   a. coupling a plurality of silicon controlled rectifiers in a three-phase bridge rectifier circuit, and
   b. coupling said output signal from said first motion control means to said static power conversion means for controlling the firing of said silicon control rectifiers so as to control the output power of said static power conversion means and drive said additional motor in synchronism with said motor-generator set to increase the power to said at least first motion.

\* \* \* \* \*